United States Patent

[11] 3,549,164

| [72] | Inventor | Gilbert E. Raynor<br>Box 71, North Conway, N.H. 03860 |
|---|---|---|
| [21] | Appl. No. | 764,858 |
| [22] | Filed | Oct. 3, 1968 |
| [45] | Patented | Dec. 22, 1970 |

[54] COMBINATION BABY STROLLER AND VEHICLE SEAT
9 Claims, 12 Drawing Figs.

[52] U.S. Cl.................................................. 280/30,
74/551.5; 280/47.25, 280/47.37; 297/254
[51] Int. Cl....................................................... B62b 7/12
[50] Field of Search........................................... 280/30, 31,
47.17, 47.25, 47.37, 47.38; 297/354, 356;
74/551.3, 551.4, 551.5; 16/115

[56] References Cited
UNITED STATES PATENTS
2,803,468  8/1957  Thompson..................... 280/30
3,062,583  11/1962  Hamilton........................ 297/254X
3,083,997  4/1963  Chreist, Jr. .................... 280/30X
3,207,528  9/1965  Hasche............................ 280/47.38

Primary Examiner—Benjamin Hersh
Assistant Examiner—Leslie J. Paperner
Attorney—John B. Dickman, III ABSTRACT: A combination baby stroller and car seat characterized by a rigid one-piece body contoured to fit a car seat and having an inset wheel providing a low center of gravity. Arcuate tubular members on the sides of the body telescopically accommodate corresponding arcuate rigid handle members having bent end portions which when extended may be moved synchronously to an inturned position to form a stroller handle, and when retracted, separate to form a hook means engageable over the back of a car seat. Synchronized bevel gears control the simultaneous turning of the handles, and latch means are provided for securing the handles in the selected position of adjustment.

PATENTED DEC 22 1970

INVENTOR.
GILBERT E. RAYNOR

BY John B. Dickman III
AGENT.

PATENTED DEC 22 1970

INVENTOR.
GILBERT E. RAYNOR

BY *John B. Dickman III*

AGENT.

INVENTOR.
GILBERT E. RAYNOR

BY John B. Dickman III
AGENT.

3,549,164

COMBINATION BABY STROLLER AND VEHICLE SEAT

This invention relates to a combination baby stroller and vehicle seat, and has as its primary object the provision of such an article having a unitary body structure contoured internally to contact an infant, and externally to fit on the seat of a vehicle such as an automobile, and having an inset or recessed wheel or wheels to facilitate maneuvering when used as a stroller.

A further object of the invention is the provision of a device of this character having a pair of extensible and retractable handle members which, when extended, serve as a handle for manipulating the stroller, and when retracted, serve as a hook extending over the back of the vehicle seat to retain the device in position.

A further object of the invention is the provision of such a handle structure which may be rotated to open position when retracted, and to a closed position when extended, together with means for synchronizing the opening and closing of the handles, and latch means for retaining the handles in a selected position of adjustment.

A still further object of the invention is the provision of a device of this character which may be readily positioned on the seat of a vehicle or removed therefrom without the necessity of the removing the infant, and which is simple and easy to handle in either of its two capacities for use.

Still other objects reside in the combinations, elements and arrangements of parts and features of construction, all as will be more fully pointed out hereinafter and disclosed in the accompanying drawings, wherein there are shown preferred embodiments of this inventive concept.

SUMMARY OF THE INVENTION

Briefly, the invention comprises a unitary body contoured to receive an infant and rest on a vehicle seat, and provided with a recessed wheel or wheels. Arcuate tubular sockets extend in parallel relation along the sides of the body and accommodate correspondingly arcuate handle members which are provided at their extremities with angularly offset portions and downwardly inclined end portions, the extremities of the latter being connected and provided with cone or bevel gears which synchronize the turning movements of the handles when extended for use as either stroller handles or hooks adapted to extend over the back of the vehicle seat. Releasable latch means serve to hold the handles in a selected position.

In the drawings.

Similar reference characters refer to similar parts throughout the several views of the drawings.

Figure 2:
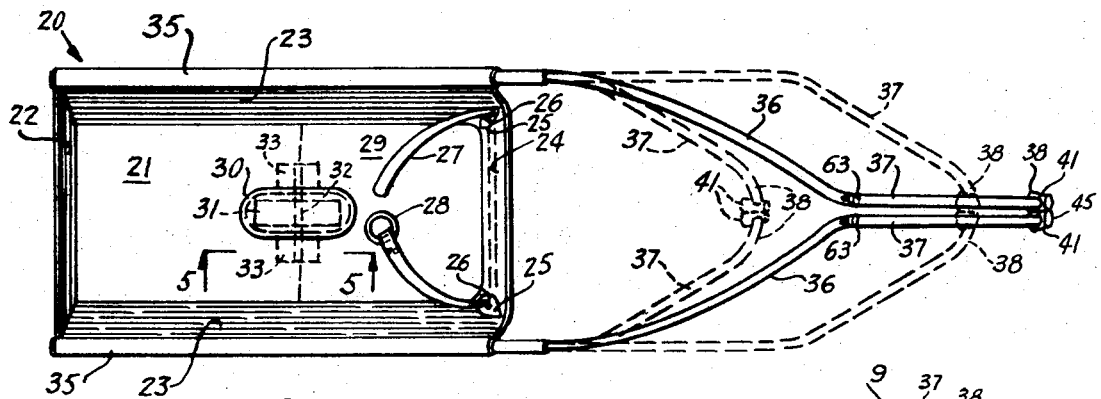
FIG. 2 is a top plan view of the device of FIG. 1 showing in full and dotted lines the handles in the same position.

Having reference now to the drawings in detail, there is generally indicated at 20 a body portion, preferably of unitary construction, and comprised of plastic, metal or other suitable material, having a bottom 21 and an inclined front wall 22, sidewalls 23 also inclined outwardly, and a rear wall or back 24. Rear wall 24 is provided with tapered corner portions 25 having slotted openings 26 therethrough for the accommodation of a safety strap 27 having a conventional buckle 28. Bottom wall 21 is provided at its rear with a depending protuberance 29 upon which the device may be rested when not supported, in a manner to be described more fully hereinafter, by the handles, for use as a stroller.

An upwardly extending hollow protuberance 30 is centrally positioned in the bottom portion, and contains a wheel 31 which is mounted on an axle 32, the ends of the latter being secured to the bottom of the body by means of straps 33, suitably secured thereto as by welding or the like. Suitable internal bearings may be provided in wheel 31, if desired.

A pair of parallel arcuate tubular members 35 extend along the tops of the sidewalls 23 from the front wall 22 to a point slightly above and to the rear of back 24, and contain telescopically a pair of slidable arcuate handle members 36 configured to conform to the curvatures of the tubular members or sockets 35. The upper portion of each handle member 36 terminates in a relatively straight portion 37, each of which, in turn, is provided at its end with a downwardly turned hooklike portion 38.

Secured to each down-turned end handle portion and extending in offset relation thereto is a stub axle 40 upon which is mounted a conical member 41. Each conical member 41 is provided on its confronting face with a series of meshing teeth 42 and a face portion 43, the latter serving as stops to preclude excessive rotation of the members 41. A strap or band 45 connects the outer extremities of frustoconical members 41 to prevent their separation and disengagement of the teeth thereof. The arrangement is thus such that when members 38 are turned, for a purpose and in a manner to be described more fully hereinafter, the turning of one through the meshing teeth will correspondingly turn the other.

Figure 1:
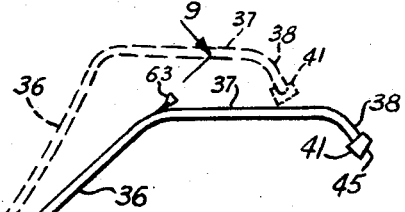
FIG. 1 is a side elevational view of the combined stroller and seat of the instant invention shown in position on a vehicle seat, with the handles shown in full lines in extended closed position, and in dotted lines in extended open position and retracted position.
Figure 4:
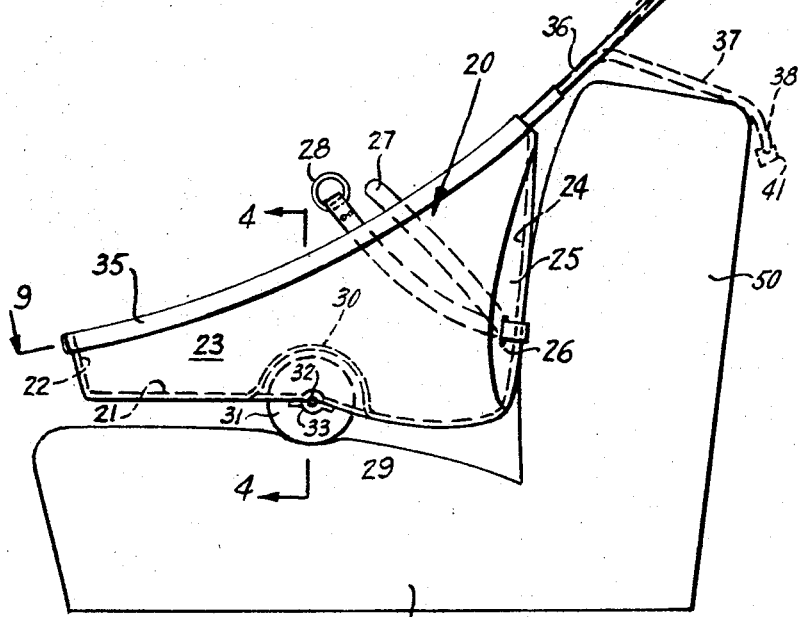
FIG. 4 is an enlarged sectional view taken substantially along the line 4–4 of FIG. 1 as viewed in the direction indicated by the arrows.

The arrangement is thus such that when handle members 36 are telescoped inwardly they assume the position shown in dotted lines adjacent the back 50 of a vehicle seat 51 as shown in FIG. 1 in dotted lines, the portions 38 hooking over the back of the seat to retain the body 20 on the seat. Conventional vehicle seat belts may then be employed to hold the entire unit in position on the seat.

Latch means are provided for retaining the handle members in the retracted position, and will be described more fully hereinafter.

Figure 3:
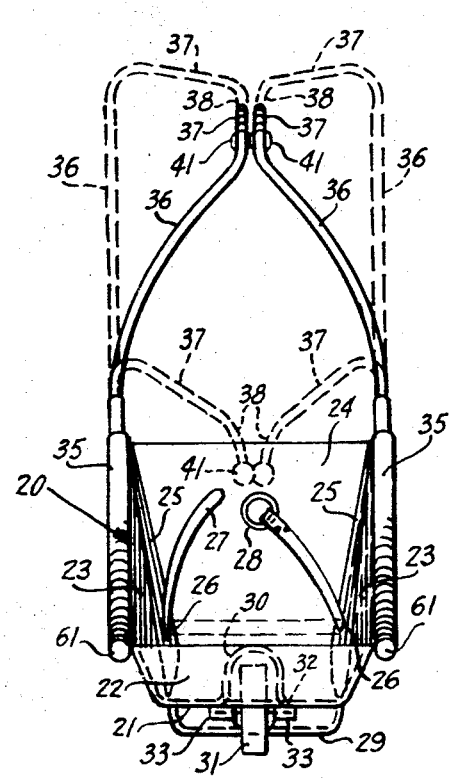
FIG. 3 is a front elevational view of the device of FIGS. 1 and 2 showing the handles in full and dotted lines in the same relative positions.
Figure 5:
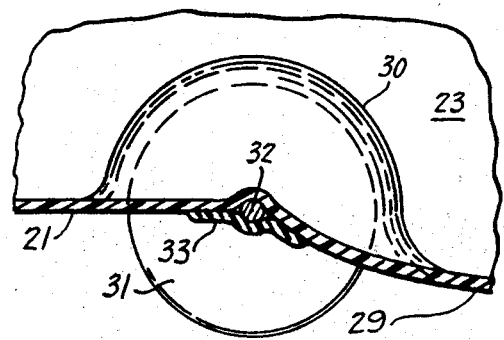
FIG. 5 is an enlarged fragmentary sectional view taken substantially along the line 5–5 of FIG. 2.
Figure 6:
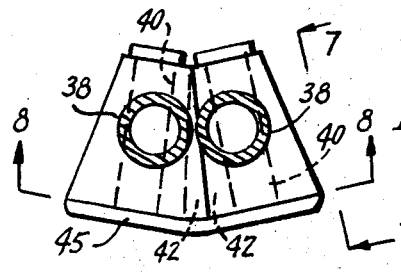
FIG. 6 is an enlarged detailed sectional view of the extremities of the handle members.
Figures 7, 8:
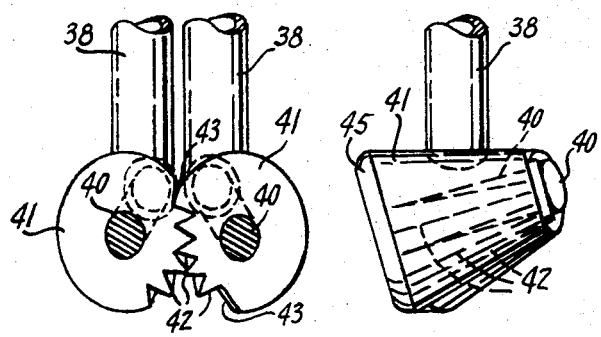
FIG. 7 is a sectional view taken substantially along the line 7–7 of FIG. 6.
FIG. 8 is a sectional view taken substantially along the line 8–8 of FIG. 6.

When the handles are extended after the device has been removed from the vehicle for use as a stroller, their extension is limited when the ball detent 55 contacts bushing 58, and they assume the position shown in the outer or remote dotted lines in FIGS. 1, 2 and 3, and portions 37 are then turned inwardly to the parallel full-line position, whereupon the parallel portions 37 may be grasped in one hand to facilitate the manipulation of the device as a stroller, while the rotation of the handle members 36 displaces the plane of their arcs from parallel with the plane of the arcs of tubular members 35, providing interference between the inner ends of the handle members and tubular members 35 to lock the handle members 36 in the extended position. Cone gears 41 as previously described provide for synchronous motion of the handles when turned inwardly. Similar synchronous movement is provided when it is desired to extend the handles prior to retracting them for using the device as a vehicle seat.

The angle between the axles 40 and the end portions 38 establishes the proper relationship between the arcs described by the end portions to provide an overcenter action to hold the handles either spread or closed. The location of the connecting member 45 below the handle portions 38 causes the lifting effort involved in wheeling the unit to hold the handle portion 38 in closed relation, since the lever axis falls below the handle grips 38 on a line between the plate 45 and the wheel 31.

Figure 9:
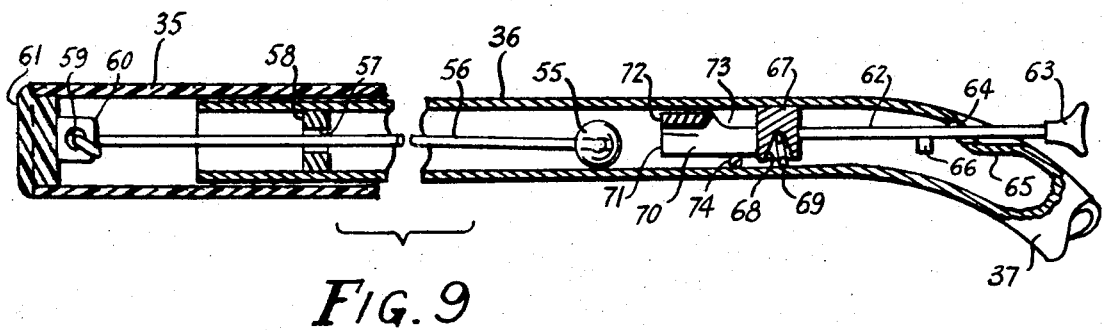
FIG. 9 is an enlarged sectional view, partially broken away, taken substantially along the line 9–9 of FIG. 1.

Locking means are provided for retaining the handle portions in retracted position when the device is used as a vehicle seat, and take the form, as best shown in FIG. 9, of a ball detent 55 which is secured to the end of an elongated flexible rod 56 which extends through an opening 57 of bushings 58 interiorly positioned adjacent the inner end of handle section 36. It is to be noted that two such locking mechanisms are provided, one in association with each handle member. The other end of rod 56 is secured in an opening 59 in a lug 60 carried by an end cap 61 which is fixed in the lower or front end of each tubular member 35. Ball 55 by its engagement with bushing 58 serves as a stop to prevent the disengagement of telescopic section 36 with its socket member 35.

An operating rod 62 carrying a pushbutton head 63 extends through an opening 64 in an indentation 65 in each handle member 36, the indentation and opening being formed at the juncture or bend between portions 36 and 37. A stop member 66 is provided to prevent undue extension of operating rod 62 and its associated components. Rod 62 is secured to a block 67 interiorly of handle 36, the block having a cut away portion 68 therein within which is positioned an over center snap spring 69. A slide 70 having an open end 71 and a top seer block 72 adjacent the open portion 73 is fixed to body 67, while a cross pin 74 extends across each member 36 immediately beneath the slide block in a position forwardly of or interiorly of block 67. The arrangement is such that when members 36 are retracted into tubular sockets 35 to their full extent, ball detent 55 moves through the open end 71 of slide 70, passing under the seer block 72, and is deflected by the cross pin 74 into the open portion 73 which allows the ball detent 55 to pass over the cross pin 74 and, pushing against the body 67, move the seer block 72 to a position opposite the cross pin 74, while simultaneously moving the spring 69 into an overcenter position to restrain the body 67 and the seer block 72 in the new position. With the seer block 72 in position opposite the cross pin 74 the ball detent cannot deflect to pass over the cross pin 74, and thus is locked behind cross pin 74. Exerting pressure against handle member 63 moves slide 70 and opening 73 to a position to permit ball detent 55 to ride over cross pin 74 so that the handle may be extended, while spring 69 moves to the opposite overcenter position. Stop 66 precludes extension of slide 70 to a point beyond its normal relation with cross pin 74.

Figure 10:
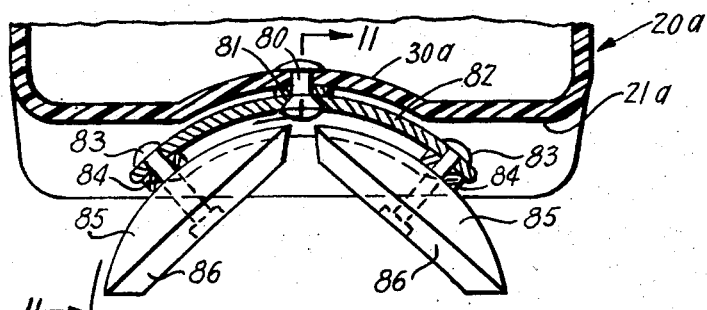
FIG. 10 is a fragmentary sectional view showing a modified form of wheel arrangement.
Figure 11:
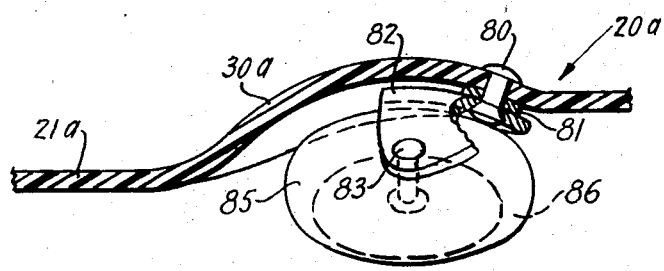
FIG. 11 is a sectional view taken substantially along the line 11–11 of FIG. 10 as viewed in the direction indicated by the arrows.

FIGS. 10 and 11 disclose a modified form of wheel structure wherein the bottom 21a of body 20a is provided with a hemispherical domed recess 30a through the center of which is passed a pivot pin or rivet 80 which extends through a bushing 81 and rotatably mounts a concaved wheel-supporting frame 82. At the opposite ends of frame 82 are two angularly disposed converging stub axles 83 each of which is provided with a bearing 84 and mounts a hemispherical or dome-shaped wheel member 85. The edges of wheel members 85 are beveled as at 86, the bevel corresponding to the angle of inclination of the mounting, so that the beveled edge presents a flat surface to the ground. This arrangement provides a broad support surface to obtain the freewheeling characteristics of large wheels without increasing the ground clearance of the body, interfering with its fit in the seat of the car. Additionally, the shape of the wheels provides maximum structural strength in minimum space, spreading the weight transfer over a relatively broad area. With this configuration, steering is effected by a twisting movement of the handle members tilting the body and acting through pin 80, guides the wheels in the desired direction.

Figure 12:
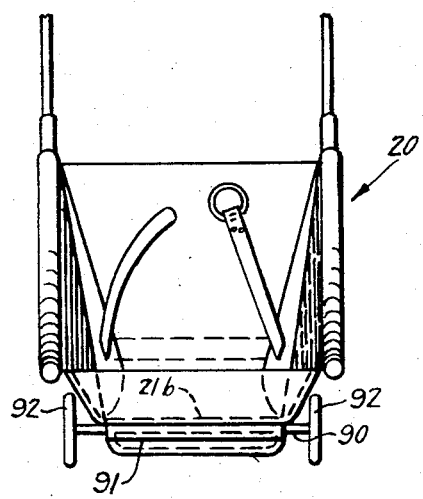
FIG. 12 is a front elevational view, partially broken away, of a device of this character embodying a still further modified wheel arrangement.

In some instances a two-wheeled configuration permitting the use of larger wheels and more even distribution of the weight load is desirable. In such case the bottom 21b of body 20b is relatively flat and provided with a transverse groove in which seats an axle 90 which is held in position by a relatively broad transverse strap member 91 suitably secured to the bottom 21b. Spaced wheels 92 are mounted on each end of axle 90 in any desired conventional manner, as shown in FIG. 12.

From the foregoing it will now be seen that there is herein provided an improved combination baby stroller and vehicle seat which accomplishes all of the objects of this invention and others, including many advantages of great practical utility and commercial importance.

I claim:

1. A combination baby stroller and vehicle seat comprising in combination:
   a body adapted for the reception of an infant;
   wheel means normally supporting said body;
   said body having substantially parallel sides;
   a tubular arcuate handle member extensible and retractable, rotatable in each socket;
   each handle member having an offset hooked end portion;
   means connecting said hooked end portions; and
   said hooked ends being adapted, when said handles are retracted and outwardly rotated, to hook over the back of a car seat, and when said handles are extended and said hooked ends rotated inwardly, to propel said stroller.

2. The structure of claim 1 wherein said wheel means comprise a single centrally located wheel extending into an indentation in the base of said body.

3. The structure of claim 1 wherein said wheel means includes a transverse axle and a wheel at each end thereof.

4. The structure of claim 1 wherein said wheel means include a pair of inwardly and downwardly inclined wheels, each having a beveled edge flush with the ground and a single swivel support for said pair of wheels centrally mounted in the bottom of said body.

5. The structure of claim 1 including means for simultaneously extending or retracting and rotating said handles.

6. The structure of claim 5 wherein said last-mentioned means include meshing cone gears adjacent the means connecting the hooked end portions, and stop means limiting the rotation of said cone gears.

7. The structure of claim 1 wherein lock means are provided for holding said handles in retracted position.

8. The structure of claim 7 wherein said lock means include:
   a ball detent in each socket;
   a flexible rod carrying said ball detent, and connected to said socket;
   a slide in each handle having an opening engaging said ball detent;
   a seer block carried by the slide;
   a cross pin adjacent the seer block and beneath the opening;
   said seer block holding said ball detent against removal, the position of said opening permitting said ball detent to deflect over said cross pin;
   spring means restraining said slide and seer against inadvertent movement; and
   operating means extending exteriorly of each handle for moving said slide.

9. The structure of claim 8 wherein said spring means include a spring carried by said slide and having an overcenter action normally urging said slide in a direction opposite to pressure exerted thereon.